United States Patent [19]
Hoshino

[11] Patent Number: 6,031,641
[45] Date of Patent: Feb. 29, 2000

[54] IMAGE PROCESSING APPARATUS FOR DISPLAYING AND ALTERING COLOR IMAGES

[75] Inventor: Takashi Hoshino, Kanagawa-ken, Japan

[73] Assignee: Fuji Photo Film Co., Ltd., Kanagawa-ken, Japan

[21] Appl. No.: 08/848,597

[22] Filed: Apr. 29, 1997

[30] Foreign Application Priority Data

Apr. 30, 1996 [JP] Japan ................................ 8-109700

[51] Int. Cl.$^7$ ................................ G03F 3/08; H04N 1/40
[52] U.S. Cl. ........................... 358/521; 358/518; 358/448
[58] Field of Search ..................... 358/521, 518, 358/527, 530, 531, 537, 528, 448, 451, 452, 471, 474, 505, 296; 382/162, 166, 167

[56] References Cited

U.S. PATENT DOCUMENTS 4,710,821   12/1987   Ohta ........................................ 358/451
5,027,196   6/1991   Ono et al. ................................ 358/527

*Primary Examiner*—Kimberly A. Williams

[57] ABSTRACT

An image processing apparatus is adapted for a color image reproducing system for photo-electrically reading out a color image, converting so-obtained image data to digital signals, effecting image processing on the image data and reproducing a color image. The image processing apparatus includes a hard disk for storing image data obtained by photoelectrically reading out a plurality of color image, an image processing section for effecting image processing on the image data stored in the hard disk and reducing the number of pixels of the image data, a CRT for simultaneously displaying a plurality of color images based on the image data whose number of pixels has been reduced, and a keyboard through which an instruction signal is input for altering image processing conditions of the image processing section. According to the thus constituted image processing apparatus, it is possible to reproduce a plurality of color images so that color images having uniform tone, gradation, density and the like as a whole can be reproduced.

15 Claims, 9 Drawing Sheets

10: TRANSMISSION TYPE IMAGE READ-OUT APPARATUS

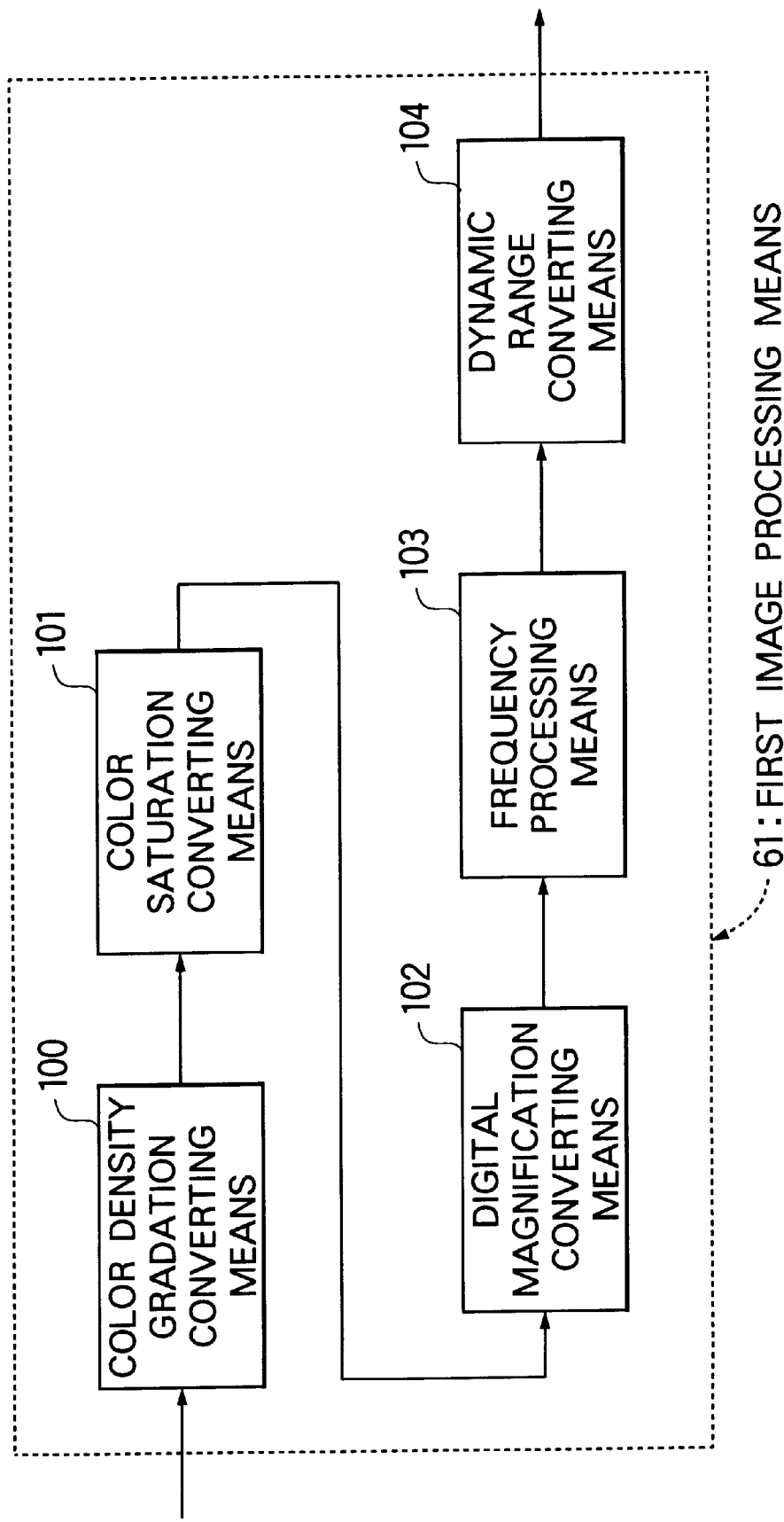

IMAGE PROCESSING APPARATUS FOR DISPLAYING AND ALTERING COLOR IMAGES

BACKGROUND OF THE INVENTION

The present invention relates to an image processing apparatus and, particularly, to such an apparatus used with a color image reproducing system for photoelectrically reading out a color image, converting so-obtained image data to digital signals, effecting image processing on the image data and reproducing a color image.

DESCRIPTION OF THE PRIOR ART

There is proposed a color image reproducing system for photoelectrically reading a color image recorded on a negative film, a reversal film, a color print or the like using a read-out means provided with a photoelectrical conversion element such as a CCD (charge coupled device), converting so-obtained color image data to digital signals, storing the image data in a frame memory in an image processing apparatus, effecting image processing on the image data stored in the frame memory, and reproducing a color image on a recording material such as a color photographic paper.

According to this color image reproducing system, even if a color image is taken under improper conditions such as under-exposure, over-exposure or the like and recorded on a negative film, a reversal film, a color print or the like, a color image having desired tone and gradation can be reproduced by effecting image processing on the image data.

In this color image reproducing system, image processing conditions are automatically determined by the image processing apparatus in accordance with kinds of color images of objects recorded on a negative film, a reversal film, a color print or the like, or are determined by an operator in accordance with the customer's request, kinds of color images of objects or the like after once reproducing the color images on display means such as a CRT and viewing the individual color images. In either case, image processing conditions are determined for each color image to reproduce color images. Therefore, in the case where a plurality of color images recorded on one negative film or one reversal film are simultaneously reproduced or the case where color images recorded on a group of color prints to be reproduced at the request of a customer are simultaneously reproduced and the customer wishes the plurality of color images recorded on the negative film, the reversal film, the color prints or the like to be reproduced so that color images having uniform tone, gradation, density and the like as a whole can be reproduced, it is impossible to satisfy the customer's wish.

SUMMARY OF THE INVENTION

It is therefore an object of the present invention to provide an image processing apparatus used with a color image reproducing system for photo-electrically reading out a color image, converting so-obtained image data to digital signals to be stored in image data storing means, effecting image processing on the image data stored in the image storing means and reproducing a color image, specifically such an image read-out apparatus capable of reproducing a plurality of color images so that color images having uniform tone, gradation, density and the like as a whole can be reproduced.

The above and other objects of the present invention can be accomplished by an image processing apparatus for a color image reproducing system for photo-electrically reading out a color image, converting so-obtained image data to digital signals, effecting image processing on the image data and reproducing a color image. The image processing apparatus comprising image data storing means for storing image data obtained by photoelectrically reading out a plurality of color image, image processing means for effecting image processing on the image data stored in the image storing means and reducing the number of pixels of the image data, color image displaying means for simultaneously displaying a plurality of color images based on the image data whose number of pixels has been reduced, and image processing condition altering means for altering image processing conditions of the image processing means.

In a preferred aspect of the present invention, the color image displaying means is constituted so as to reproduce color images based on the image data image-processed in accordance with the image processing conditions altered by the image processing condition altering means.

The above and other objects and features of the present invention will become apparent from the following description made with reference to the accompanying drawings.

BRIEF DESCRIPTION OF THE DRAWINGS

FIG. 9 is a block diagram showing the particulars of first image processing means.

DESCRIPTION OF THE PREFERRED EMBODIMENTS

Figure 1:
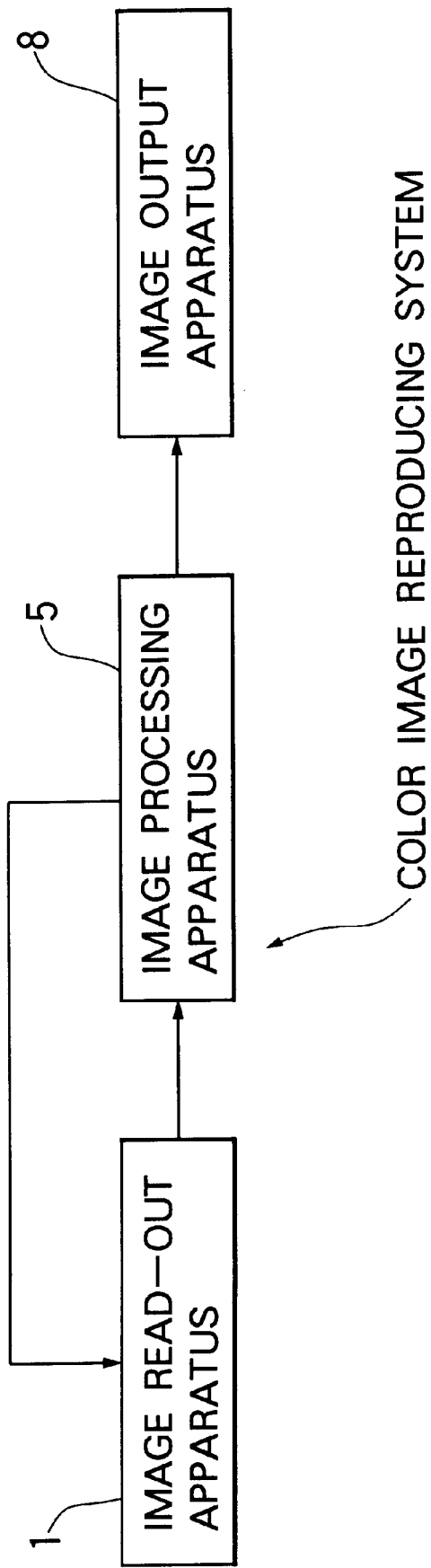
FIG. 1 is a block diagram of a color image reproducing system including an image processing apparatus which is an embodiment of the present invention.
Figure 3:
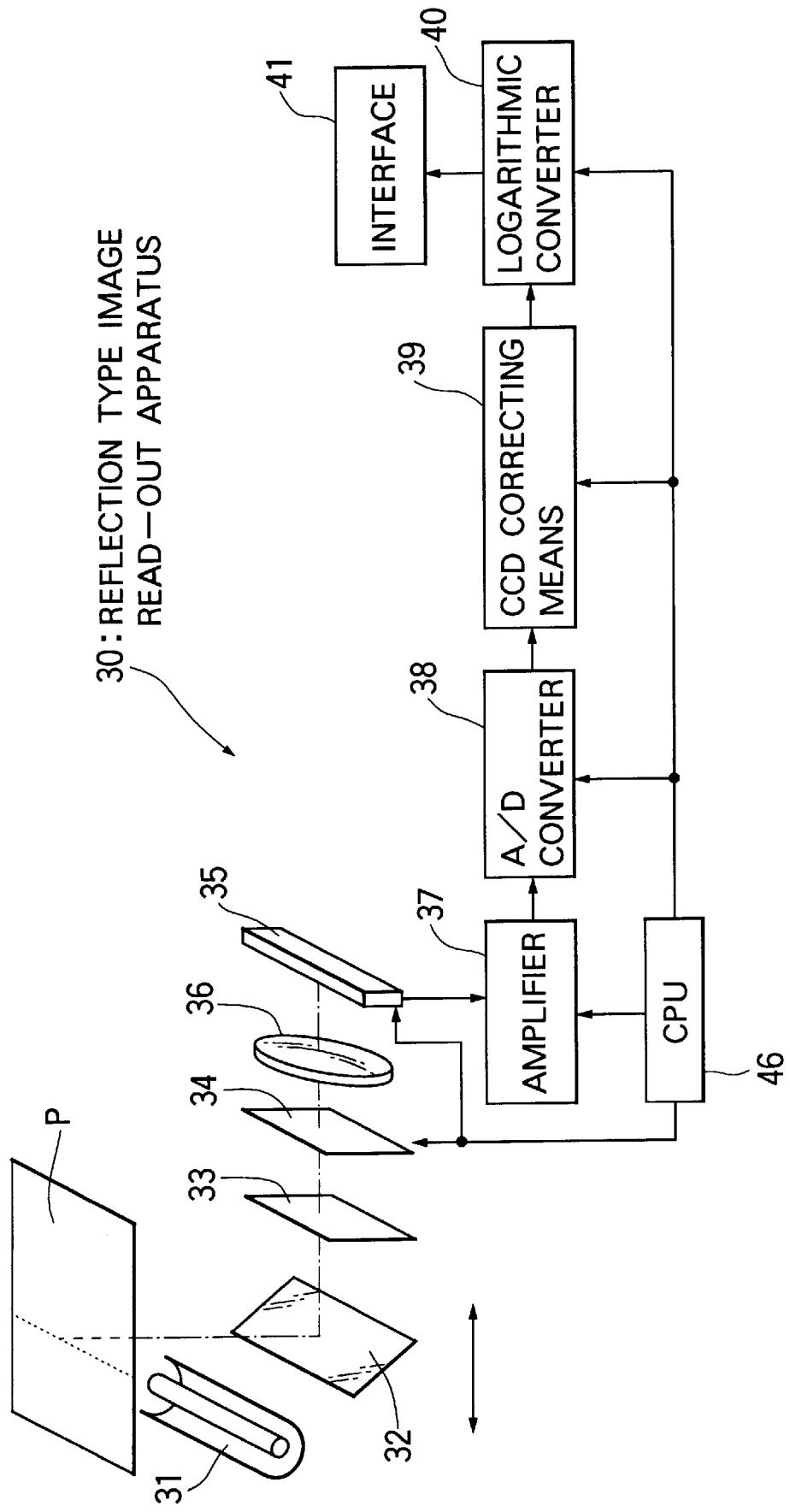
FIG. 3 is a schematic view of a reflection type image read-out apparatus for a color image reproducing system including an image processing apparatus which is an embodiment of the present invention.

As shown in FIG. 1, a color image reproducing system comprises an image read-out apparatus 1 for reading a color image and generating digitized image data, an image processing apparatus 5 for carrying out prescribed image processing on the image data generated by the image read-out apparatus 1 and an image output apparatus 8 for reproducing a color image based on the image data image processed by the image processing apparatus 5. The color image reproducing system is configured so that two types of image read-out apparatuses can be selectively connected with the image processing apparatus 5 as the image read-out apparatus 1, a transmission type image read-out apparatus 10 for photoelectrically reading a color image recorded on a film F such as a negative film or reversal film and a reflection type image read-out apparatus 30 such as shown in FIG. 3 for photoelectrically reading a color image recorded on a color print P. As a result, the color image reproducing system can reproduce both color images recorded on negative, reversal or other such films F and color images recorded on color prints P.

Figure 2:
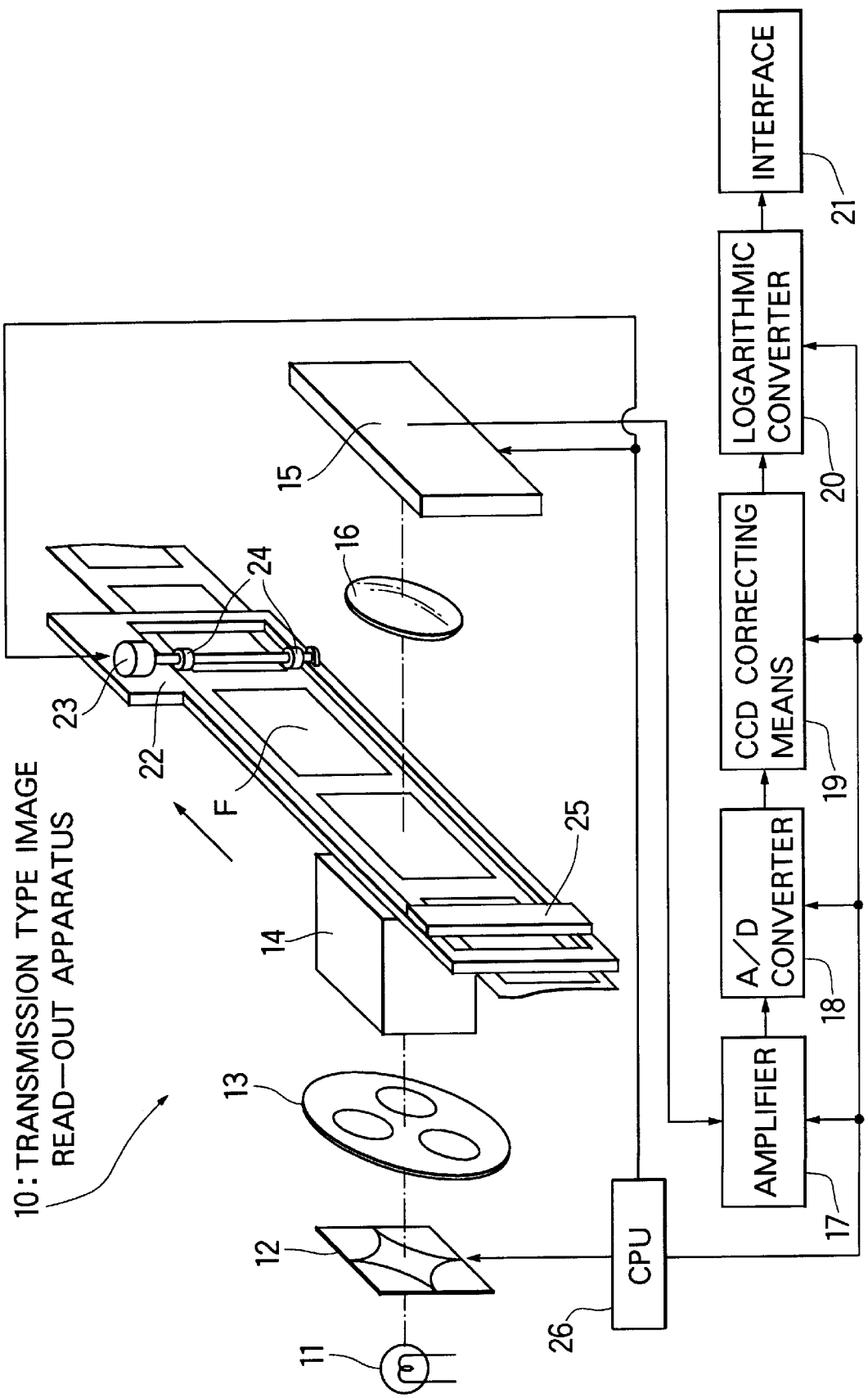
FIG. 2 is a schematic view of a transmission type image read-out apparatus for a color image reproducing system including an image processing apparatus which is an embodiment of the present invention.

FIG. 2 is a schematic view showing a transmission type image read-out apparatus 10 for a color image reproducing system including an image processing apparatus which is an embodiment of the present invention.

As shown in FIG. 2, the transmission type image read-out apparatus 10 is adapted to photoelectrically read a color image by directing light onto a color image recorded on a negative, reversal or other such film F and detecting the light transmitted through the film F. It comprises a light source 11, a light regulating unit 12 for regulating the passage of the light emitted by the light source 11, a color separation unit 13 for separating the light emitted by the light source 11 into red (R), green (G) and blue (B) color components, a diffusing unit 14 for diffusing the light emitted by the light source 11 so that it evenly illuminates the film F, a CCD area sensor 15 for photoelectrically detecting the light transmitted through the film F and a lens 16 for focusing the light transmitted through the film F on the CCD area sensor 15.

The transmission type image read-out apparatus 10 further includes an amplifier 17 for amplifying R, G, B image signals generated by the CCD area sensor 15 based on the photoelectrically detected R, G and B color components, an A/D converter 18 for digitizing the image signals, CCD correcting means 19 for processing the digitized image signals from the A/D converter 18 to correct for dark current and variance in sensitivity among the individual pixels and a logarithmic converter 20 for converting R, G, B image data into density data. The logarithmic converter 20 is connected with an interface 21.

The film F is held in a carrier 22. After one frame of the film F held in the carrier 22 has been conveyed to a prescribed position by rollers 24 driven by a motor 23, it is maintained stationary for read-out. When read-out of the color image of the frame has been completed, the next frame is conveyed to the read-out position. Reference numeral 25 in FIG. 2 designates a picture region detection sensor which detects the density distribution of the color images recorded on the film F and outputs a density signal indicative of the detected density to a CPU (central processing unit) 26 for controlling the transmission type image read-out apparatus 10. The CPU 26 uses the density signal to calculate the position of the color image picture region and stop the motor 23 when it discriminates that the color image picture region has reached the prescribed position.

In the transmission type image read-out apparatus 10, red light is first directed onto the film F and the CCD area sensor 15 photoelectrically detects the light transmitted through the film F to generate R image data corresponding to one frame of the film F. The generated R image data corresponding to one frame are transferred to the image processing apparatus 5 every ten bits. Green light is then directed onto the film F and the CCD area sensor 15 photoelectrically detects the light transmitted through the film F to generate G image data corresponding to one frame of the film F. The generated G image data corresponding to one frame are transferred to the image processing apparatus 5 every ten bits. Blue light is finally directed onto the film F and the CCD area sensor 15 photoelectrically detects the light transmitted through the film F to generate B image data corresponding to one frame of the film F. The generated B image data corresponding to one frame are transferred to the image processing apparatus 5 every ten bits. As a result, the transmission type image read-out apparatus 10 transfers the generated image data every one frame of R, G, B image data to the image processing apparatus 5.

FIG. 3 is a schematic view of a reflection type image read-out apparatus 30 for a color image reproducing system including an image processing apparatus which is an embodiment of the present invention.

As shown in FIG. 3, the reflection type image read-out apparatus 30 is adapted to photoelectrically read a color image by directing light onto a color image recorded on a color print P and detecting the light reflected by the color print P. It comprises a light source 31, a mirror 32 for reflecting light emitted by the light source and reflected by the surface of the color print P, a color balance filter 33 for adjusting the R, G, B sensitivity of the light reflected by the surface of the color print P, a light regulating unit 34 for regulating the passage of the light reflected by the surface of the color print P, a CCD line sensor 35 for photoelectrically detecting the light reflected by the color print P and a lens 36 for focusing the light reflected by the color print P on the CCD line sensor 35. The CCD line sensor 35 is constituted to have three lines corresponding to three colors, R, G and B. The CCD line sensor 35 reads the color image recorded on the color print P two-dimensionally by detecting light reflected from the color print P while the light source 31 and the mirror 32 are moved in the direction indicated by an arrow.

The reflection type image read-out apparatus 30 further includes an amplifier 37 for amplifying R, G, B image signals generated by the CCD line sensor 35 based on the photoelectrically detected R, G and B color components, an A/D converter 38 for digitizing the image signals, CCD correcting means 39 for processing the digitized image signals from the A/D converter 38 to correct for dark current and variance in sensitivity among the individual pixels and a logarithmic converter 40 for converting R, G, B image data into density data. The logarithmic converter 40 is connected with an interface 41.

The reflection type image read-out apparatus 30 is equipped with a carrier (not shown) for holding the color print P stationary and drive means (not shown) for conveying the light source 31 and the mirror 32 in the direction of the arrow. The reflection type image read-out apparatus 30 is controlled by a CPU 46.

In this embodiment, the reflection type image read-out apparatus 30 is constituted so that the CCD line sensor 35 includes three line sensors corresponding to three colors, R, G and B, is moved over the color image recorded on the color print P and while generating image data corresponding to the three colors, R, G and B, it progressively transfers the generated image data to the image processing apparatus 5. As a result, the reflection type image read-out apparatus 30 of this embodiment transfers the image data every twelve bits and pixel by pixel to the image processing apparatus 5 in order of R image data of a first pixel, G image data of the first pixel, B image data of the first pixel, R image data of a second pixel, G image data of the second pixel, B image data of the second pixel, and so on.

Figure 4:
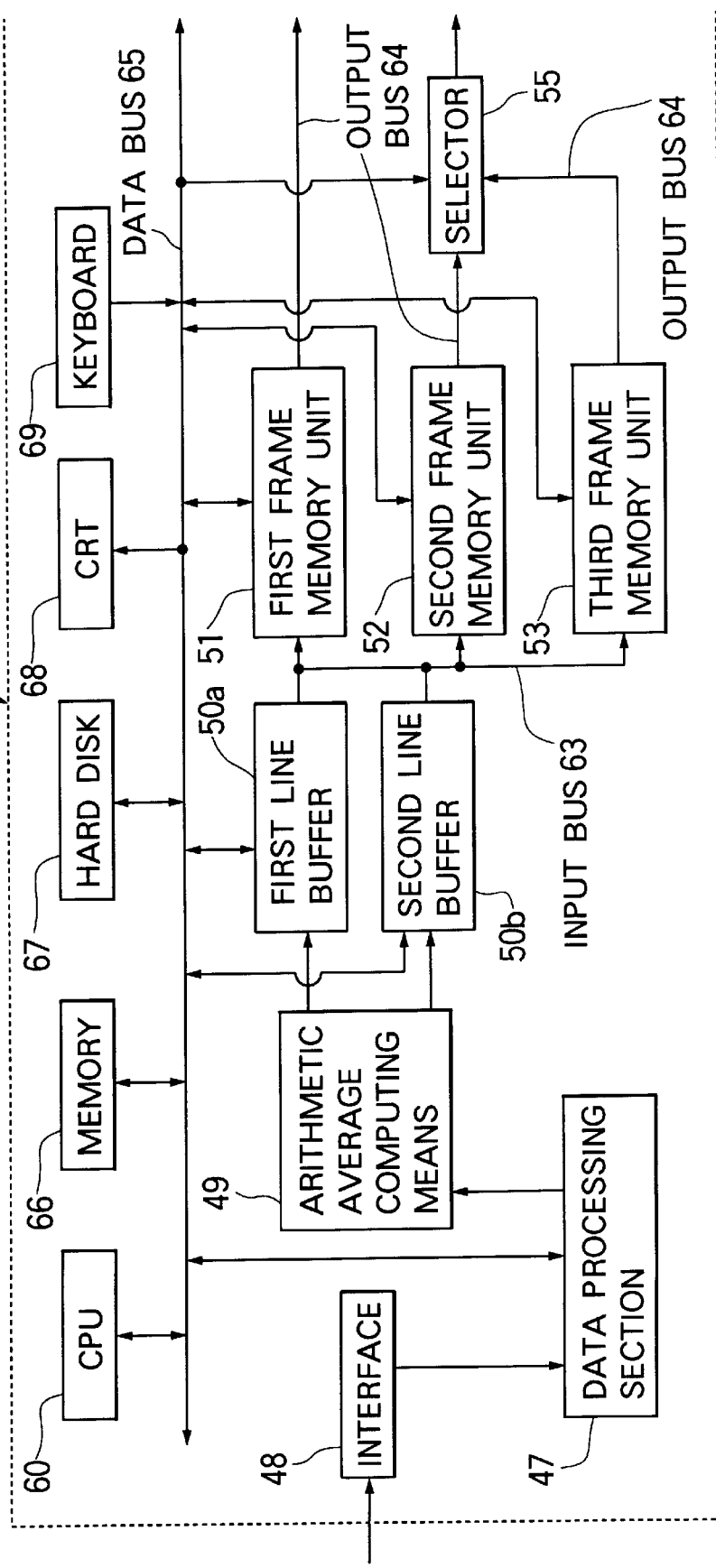
FIG. 4 is a block diagram of an image processing apparatus which is an embodiment of the present invention.
Figure 5:
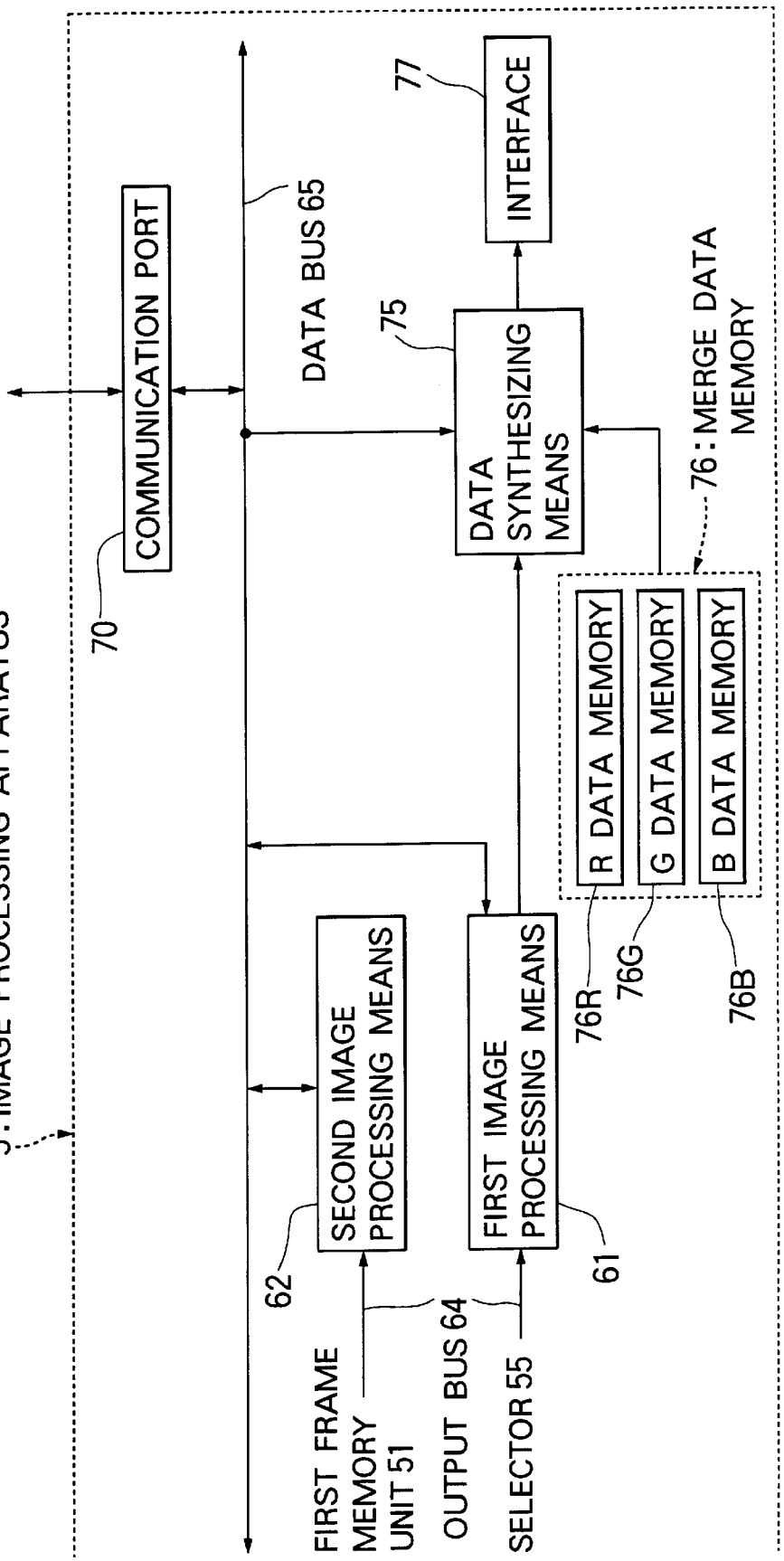
FIG. 5 is a block diagram of an image processing apparatus which is an embodiment of the present invention.

FIGS. 4 and 5 are block diagrams of an image processing apparatus 5 which is a preferred embodiment of the present invention.

As shown in FIGS. 4 and 5, the image processing apparatus 5 comprises an interface 48 which can be connected to the interface 21 of the transmission type image read-out apparatus 10 or the interface 41 of the reflection type image read-out apparatus 30, a data processing section 47 for effecting processing such as the change in number of bits, reversal between negative and positive or the like on the image data forwarded by the transmission type image read-out apparatus 10 or the reflection type image read-out apparatus 30, arithmetic average computing means 49 for summing and averaging the values of sets of two adjacent pixels of the image data forwarded by the image read-out apparatus 1 and defining each average value as a single pixel, a first line buffer 50a and a second line buffer 50b for storing alternate lines of the image data, and a first frame memory unit 51, a second frame memory unit 52 and a third frame memory unit 53 for receiving line data stored in the line buffers 50a, 50b and transferred therefrom and storing image data corresponding to a color image recorded in one frame of the film F or in one color print P. The first line buffer 50a and the second line buffer 50b are configured so that pixels in odd numbers of each line of the image data are stored in one of the line buffers and that pixels in even numbers thereof are alternately stored in the other line buffer.

In this embodiment, the arithmetic average computing means 49 is constituted so as to sum and average the values of sets of two adjacent pixels of the image data continuously forwarded every ten bits by the transmission type image read-out apparatus 10 to define the average value as single pixels and sum and average the values of sets of two adjacent pixels of the R image data, the values of sets of two adjacent pixels of the B image data and the values of sets of two adjacent pixels of the R image data forwarded every twelve bits by the reflection type image read-out apparatus 30 to define the average values to single pixels.

Further, in this embodiment, the image read-out apparatus 1 conducts a first read-out (preliminary read-out) of the color image recorded in one frame of the film F or in one color print P to generate digital image data and the image processing apparatus 5 uses the image data generated based on the image data generated by the preliminary read-out to set the image read-out conditions for second read-out (main read-out). The main color image read-out is then conducted to generate the final digital image data. The first frame memory unit 51 stores the image data obtained by the first read-out, namely, the preliminary read-out, while the second frame memory unit 52 and the third frame memory unit 53 store the image data obtained by the second read-out, namely, the main read-out.

Figure 6:
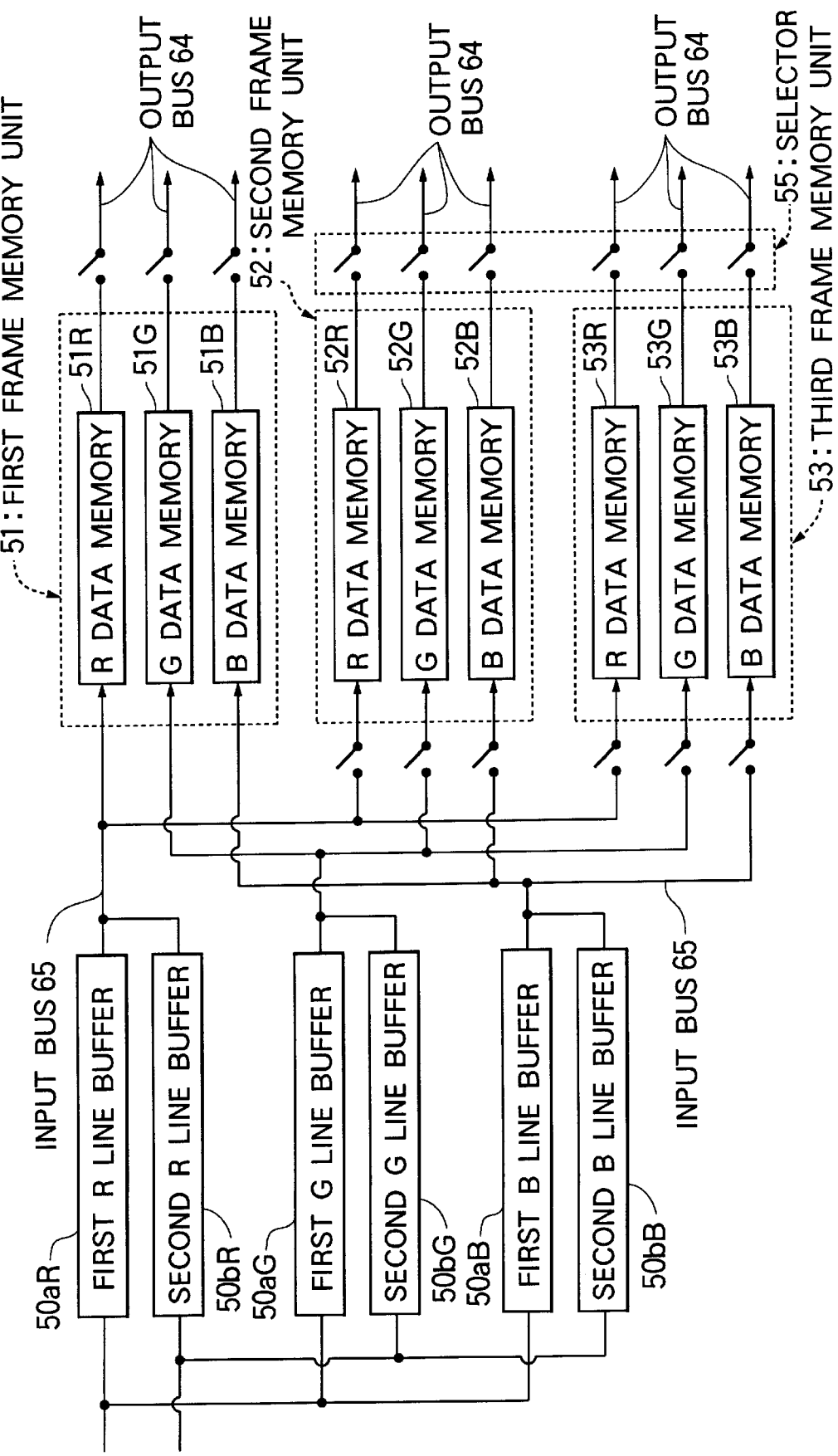
FIG. 6 is a block diagram showing the particulars of a first frame memory unit, a second frame memory unit and a third frame memory unit.

FIG. 6 is a block diagram showing the particulars of the first frame memory unit 51, the second frame memory unit 52 and the third frame memory unit 53.

As shown in FIG. 6, for enabling the image processing apparatus 5 to process the image data generated by color image read-out, the first line buffer 50a and the second line buffer 50b, or the first frame memory unit 51, the second frame memory unit 52 and the third frame memory unit 53 are each provided with R, G and B line buffers or R, G and B data memories for storing image data corresponding to red (R), green (G) and blue (B) components. Specifically, the first line buffer 50a has a first R line buffer 50aR, a first G line buffer 50aG and a first B line buffer 50aB, the second line buffer 50b has a second R line buffer 50bR, a second G line buffer 50bG and a second B line buffer 50bB, the first frame memory unit 51 has an R data memory 51R, a G data memory 51G and a B data memory 51B, the second frame memory unit 52 has an R data memory 52R, a G data memory 52G and a B data memory 52B, and the third frame memory unit 53 has an R data memory 53R, a G data memory 53G and a B data memory 53B. FIG. 6 shows the state during input of image data obtained by the preliminary read-out to the first frame memory unit 51 and output of the image data stored in the second frame memory unit 52.

In this embodiment, format altering means is formed by a CPU 60 for controlling the overall operation of the image processing apparatus 5, the first R line buffer 50aR, the first G line buffer 50aG and the first B line buffer 50aB, the second R line buffer 50bR, the second G line buffer 50bG and the second B line buffer 50bB, the R data memory 51R, the G data memory 51G and the B data memory 51B, the R data memory 52R, the G data memory 52G and the B data memory 52B, and the R data memory 53R, the G data memory 53G and the B data memory 53B for storing the image data of each color forwarded pixel by pixel or line by line by the transmission type image read-out apparatus 10 in the first, second or third frame memory unit 51, 52, 53 adapted to store image data of one frame for each color.

The thus constituted format altering means alters the format of image data in the following manner.

The transmission type image read-out apparatus 10 provided with the CCD area sensor 15 first directs red (R) light onto the film F and generates R image data of one frame of the film F to transfer them to the image processing apparatus 5. It then directs green (G) light onto the film F and generates G image data of one frame of the film F to transfer them to the image processing apparatus 5. The transmission type image read-out apparatus 10 finally directs blue (B) light onto the film F and generates B image data of one frame of the film F to transfer them to the image processing apparatus 5. As a result, in the transmission type image read-out apparatus 10, the generated image data are transferred to the image processing apparatus 5 so that each of the red (R), green (G) and blue (B) image data are transferred frame by frame.

On the other hand, in the reflection type image read-out apparatus 30 provided with the CCD line sensor 35, the CCD line sensor 35 including three line sensors corresponding to three colors of red (R), green (G) and blue (B) is moved over the color image recorded on the color print P and the like and a color image is read while it generates image data corresponding to R, G and B and progressively transfers the generated image data to the image processing apparatus 5. Therefore, the reflection type image read-out apparatus 30 can transfer the generated image data to the image processing apparatus 5 with each of R, G and B image data pixel by pixel in such a manner that R image data of a first pixel, G image data of the first pixel and B image data of the first pixel are first transferred and R image data of a second pixel, G image data of the second pixel and B image data of the second pixel are then transferred, or can transfer the generated image data to the image processing apparatus 5 with each of R, G and B image data line by line in such a manner that R image data of a first line, G image data of the first line and B image data of the first line are first transferred and R image data of a second line, G image data of the second line and B image data of the second line are then transferred. In this embodiment, the reflection type image read-out apparatus 30 is constituted so as to transfer the generated image data to the image processing apparatus 5 pixel by pixel.

In the image processing apparatus 5, the image data are stored frame by frame in the first frame memory unit 51, the second frame memory unit 52 or the third frame memory unit 53. The first frame memory unit 51 includes the R data memory 51R, the G data memory 51G and the B data memory 51B for respectively storing the image data corresponding to red (R), green (G) and blue (B), the second frame memory unit 52 includes the R data memory 52R, the G data memory 52G and the B data memory 52B for respectively storing the image data corresponding to R, G and B, and the third frame memory unit 53 includes the R data memory 53R, the G data memory 53G and the B data memory 53B for respectively storing the image data corresponding to R, G and B. The R, G and B image data are stored in the R data memory 51R, the G data memory 51G and the B data memory 51B, the R data memory 52R, the G data memory 52G and the B data memory 52B or the R data memory 53R, the G data memory 53G and the B data memory 53B in accordance with color. Accordingly, it is possible to successively store the image data progressively forwarded from the reflection type image read-out apparatus 10 as sets of the R, G and B image data frame by frame in the R data memory 51R, the G data memory 51G and the B data memory 51B of the first frame memory unit 51, the R data memory 52R, the G data memory 52G and the B data memory 52B of the second frame memory unit 52 or the R data memory 53R, the G data memory 53G and the B data memory 53B of the third frame memory unit 53.

On the other hand, in the reflection type image read-out apparatus 30, since the R image data, the G image data and the B image data are continuously transferred pixel by pixel to the image data processing apparatus 5 in such a manner that the R image data of a first pixel, the G image data of the first pixel and the B image data of the first pixel are first transferred and the R image data of a second pixel, the G image data of the second pixel and the B image data of the second pixel are then transferred, it is necessary to selectively store the R image data, the G image data and the B image data in the corresponding R data memory, G data memory and B data memory.

Therefore, in the image processing apparatus 5, when the image data forwarded from the reflection type image read-out apparatus 30 are stored in, for example, the second frame memory unit 52, the CPU 60 controls the three data memories 52R, 52G, 52B and selectively and progressively stores the R, G and B image data forwarded pixel by pixel in the R data memory 52R, the G data memory 52G and the B data memory 52B in such a manner that the R image data of a first pixel first forwarded are stored in the R data memory 52R, the G image data of the first pixel next forwarded are stored in the G data memory 52G, the B image data of the first pixel third forwarded are stored in the B data memory 52B, the R image data of a second pixel fourth forwarded are stored in the R data memory 52R, the G image data of the second pixel fifth forwarded are stored in the G data memory 52G, the B image data of the second pixel sixth forwarded are stored in the B data memory 52B and so on.

Further, in this embodiment, since each memory unit is constituted by a DRAM, refresh operation is necessary. On the other hand, the image data are forwarded independently of the refresh operation of each memory unit. Therefore, each memory unit cannot store the image data therein during the refresh operation thereof. In view of this, in this embodiment, the first line buffer 50a and the second line buffer 50b are provided upstream of the first frame memory unit 51, the second frame memory unit 52 and the third frame memory unit 53 and after they have temporarily stored the image data, the image data are stored in the first frame memory unit 51, the second frame memory unit 52 or the third frame memory unit 53, whereby the image data forwarded independently of the refresh operation of each memory unit can be stored in the first frame memory unit 51, the second frame memory unit 52 or the third frame memory unit 53.

The first line buffer 50a and the second line buffer 50b are controlled by the CPU 60 and are configured to alternately store the transferred image data. The first line buffer 50a includes a first R line buffer 50aR, a first G line buffer 50aG and a first B line buffer 50aB, and the second line buffer 50b includes a second R line buffer 50bR, a second G line buffer 50bG and a second B line buffer 50bB. The R image data are alternately stored in the first R line buffer 50aR and the second R line buffer 50bR, the G image data are alternately stored in the first G line buffer 50aG and the second G line buffer 50bG and the B image data are alternately stored in the first B line buffer 50aB and the second B line buffer 50bB.

Therefore, when the image data forwarded from the reflection type image read-out apparatus 30 are stored in, for example, the second frame memory unit 52, the CPU 60 controls the six line buffers provided upstream of of the first frame memory unit 51, the second frame memory unit 52 and the third frame memory unit 53 and selectively and progressively stores the R, G and B image data in the first R line buffer 50aR, the first G line buffer 50aG, the first B line buffer 50aB, the second R line buffer 50bR, the second G line buffer 50bG and the second B line buffer 50bB in such a manner that the R image data of a first pixel first forwarded are stored in the first R line buffer 50aR, the G image data of the first pixel next forwarded are stored in the first G line buffer 50aG, the B image data of the first pixel third forwarded are stored in the first B line buffer 50aB, the R image data of a second pixel fourth forwarded are stored in the second R line buffer 50bR, the G image data of the second pixel fifth forwarded are stored in the second G line buffer 50bG, the B image data of the second pixel sixth forwarded are stored in the second B line buffer 50bB, the R image data of a second pixel seventh forwarded are stored in the first R line buffer 50aR, the G image data of the first pixel eighth forwarded are stored in the first G line buffer 50aG, and so on.

The CPU 60 for controlling the overall operation of the image processing apparatus 5 can communicate with the CPU 26 for controlling the transmission type image read-out apparatus 10 or the CPU 46 for controlling the reflection type image read-out apparatus 30 via communication lines (not shown). It can also communicate via a communication line (not shown) with the CPU of the image output apparatus 8 described later. Based on the image data obtained by the preliminary read-out and stored in the first frame memory unit 51, the CPU 60 can adjust the image read-out conditions for the main read-out of the color image and if necessary, can also adjust the image processing conditions. Specifically, the CPU 60 decides the read-out conditions for the main read-out based on the image data obtained by the preliminary read-out so as to enable efficient utilization of the dynamic range of the CCD area sensor 15 or the CCD line sensor 35 at the time of the main read-out and outputs a read-out control signal to the CPU 26 of the transmission type image read-out apparatus 10 or the CPU 46 of the reflection type image read-out apparatus 30. Upon receiving the read-out control signal, the CPU 26 of the transmission type image read-out apparatus 10 or the CPU 46 of the reflection type image read-out apparatus 30 controls the quantity of light passage regulated by the light regulating unit 12 or the light regulating unit 34 and further controls the storage time of the CCD area sensor 15 or the CCD line sensor 35. As required, the CPU 60 at the same time outputs to first image processing means and second image processing means described later a control signal based on the obtained image data so as to adjust the image processing parameters and other image processing conditions of the first image processing means and the second image processing means to enable reproduction on color photographic paper of a color image having optimum density, gradation and tone.

Since the image data obtained by the first image read-out, namely, the preliminary read-out, is used solely for deciding the read-out conditions and the image processing conditions for the second image read-out, namely, the main read-out, it does not have to be large volume. As explained in more detail later, moreover, in this embodiment, the image processing apparatus enables the operator to reproduce a color image based on the image data obtained by the preliminary read-out on a CRT and to set the image processing conditions while observing the reproduced color image. The image processing apparatus reduces the volume of the image data obtained by the preliminary read-out to a level enabling reproduction of a color image on a CRT and stores the reduced image data in the first frame memory unit 51. To achieve this data reduction, the image read-out apparatus 1 is configured so that the CCD area sensor 15 of the transmission type image read-out apparatus 10 reads only odd fields or even fields of the image data during the preliminary read-out and that the speed of the light source 31 and the mirror 32 of the reflection type image read-out apparatus 30, i.e., the sub-scanning speed, is doubled during the preliminary read-out, thereby reducing the volume of the read-out image data to half. In addition, the image processing apparatus 5 is configured so that the arithmetic average computing means 49 sums and averages the values of sets of two adjacent pixels of the received image data and defines the average values as single pixels, thereby reducing the number of pixels per line of the image data to ½, and that only pixels of one of the odd lines and the even lines of the image data are stored alternately in the first line buffer 50a and the second line buffer 50b and only the image data stored in one of the first line buffer 50a and the second line buffer 50b are stored in the first frame memory unit 51, thereby reducing the number of pixels of the image data stored in the first frame memory unit 51 to ¹⁄₁₆. Since the number of pixels of the image data obtained by the preliminary read-out is reduced, while the second frame memory unit 52 and the third frame memory unit 53 for storing image data obtained by the main read-out have capacities enabling them to store the image data obtained by read-out of a color image recorded in one frame of the negative, reversal or other such film F or a color image recorded in one color print P, the first frame memory unit 51 for storing the image data obtained by the preliminary read-out has a much smaller capacity than the second frame memory unit 52 and the third frame memory unit 53.

The image processing apparatus 5 is further provided with first image processing means 61 adapted to enable a color image to be reproduced on color photographic paper with the desired density, gradation and tone by subjecting the image data stored in the second frame memory unit 52 and the third frame memory unit 53 to gradation correction, color conversion, density conversion and other such image processing by use of lookup tables or matrix computation, or reducing the number of pixels, and second image processing means 62 adapted to enable a color image having desired tone, gradation and density to be reproduced on the screen of a CRT explained later by subjecting the image data stored in the first frame memory unit 51 to gradation correction, color conversion, density conversion and other such image processing by use of lookup tables or matrix computation. A selector 55 selects the output of either the second frame memory unit 52 or the third frame memory unit 53 so as to input the image data stored in one or the other of the second frame memory unit 52 and the third frame memory unit 53 to the first image processing means 61.

The first frame memory unit 51, second frame memory unit 52 and third frame memory unit 53 are connected to an input bus 63 and an output bus 64. The image processing apparatus further has a data bus 65 to which are connected the CPU 60 for overall control of the color image reproducing system, a memory 66 for storing an operating program executed by the CPU 60, a hard disk 67 for storing image data, a CRT 68, a keyboard 69, a communication port 70 for connection with another color image reproducing system via a communication line, and communication lines to the CPU of the transmission type image read-out apparatus 10 and the CPU 46 of the reflection type image read-out apparatus 30.

In this embodiment, the hard disk 67 has a memory capacity capable of, for example, storing at least image data obtained by reading out color images recorded on one negative film or one reversal film. The CRT 68 is adapted to display a color image reproduced based on image data obtained by the preliminary read-out and also simultaneously display a plurality of different color images based on image data obtained by the first image processing means 61 effecting image processing on image data obtained by the main read-out of different color images and reducing the number of pixels thereof. Further, in this embodiment, the operator can determine and change image processing conditions for gradation correction, color conversion, density conversion and the like effected by the first image processing means 61 by inputting image processing conditions through the keyboard 69.

Therefore, in this embodiment, when the operator inputs an instruction signal through the keyboard 69 indicating that color images recorded on one negative film, one reversal film or a group of color prints which a customer requested to be reproduced are to be reproduced as color images having uniform tone, gradation, density and the like as a whole, the CPU 69, instead of reproducing a color image on a color photographic film based on each set of image data obtained by reading out a color image recorded in one frame of the film or a color image recorded on one color print, progressively reads out color images recorded on one negative film, one reversal film or a group of color prints requested to be reproduced frame by frame or print by print and stores the so-obtained image data in the hard disk 67. When the main read-out of color images recorded on one negative film, one reversal film or a group of color prints requested to be reproduced has been completed and all image data have been stored in the hard disk 67, the CPU 60 progressively outputs image data from the hard disk 67 to the first image processing means 61 and causes the first image processing means to effect prescribed image processing on the image data in accordance with predetermined image processing conditions or those changed as a result of the preliminary read-out and to reduce the number of pixels. The CPU 69 then progressively displays color images based on the image data processed by the first image processing means 61 on the screen of the CRT 68 so as to reproduce color images corresponding to color images recorded on one negative film, one reversal film or a group of color prints received from the customer.

In the image processing apparatus according to this embodiment, the operator views the color images displayed on the screen of the CRT 68 and corresponding to color images recorded on one negative film, one reversal film or a group of color prints received from the customer, determines image processing conditions so as to enable reproduction of color images having uniform tone, gradation, density and the like and inputs them through the keyboard 69, thereby causing the first image processing means 61 to again effect image processing on the image data so as to reproduce color images on the screen of the CRT 68. The operator again views the plurality of color images. This operation is repeated until the operator has confirmed it possible to reproduce color images recorded on one negative film, one reversal film or a group of color prints received from the customer to color images having uniform tone, gradation, density and the like. When the operator has confirmed it possible to reproduce color images having uniform tone, gradation, density and the like and input an instruction signal through the keyboard 69 requesting reproduction of color images on the color photographic paper, the CPU 60 progressively outputs image data obtained by reading out color images recorded on one negative film, one reversal film or a group of color prints received from the customer and stored in the hard disk 67 to the data synthesizing means 75.

The first image processing means 61 is connected to data synthesizing means 75 and the data synthesizing means 75 is connected with a merge data memory 76. The merge data memory 76 has an R data memory 76R, a G data memory 76G and a B data memory 76B for storing data corresponding to the red (R), green (G) and blue (B) components of graphics, characters or the like. The image data relating to graphics, characters and the like stored in the merge data memory 76 can be synthesized with the image data obtained by reading out a color image recorded on a film F or a color print P, thereby enabling the image output apparatus 8 explained later to reproduce a composite color image based on the two types of image data. The data synthesizing means 75 is connected with an interface 77.

Figure 7:
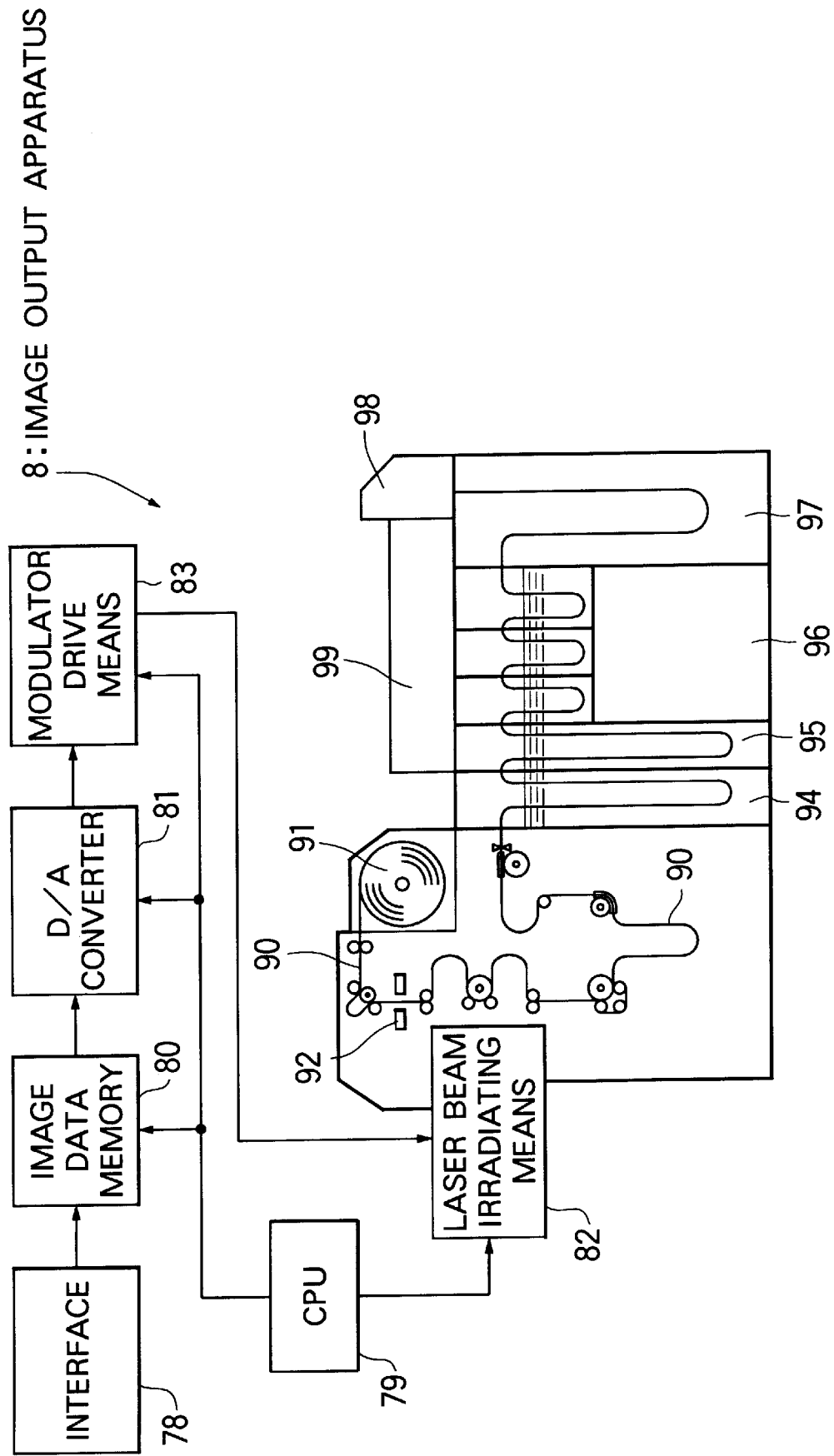
FIG. 7 is a schematic view of an image output apparatus for a color image reproducing system, which reproduces color images on color photographic paper based on image data processed by an image processing apparatus which is an embodiment of the present invention.

FIG. 7 is a schematic view of an image output apparatus for a color image reproducing system which reproduces color images on a color photographic paper based on image data processed by the image processing apparatus which is a preferred embodiment of the present invention.

As shown in FIG. 7, the image output apparatus 8 includes an interface 78 connectable with the interface 77 of the image processing apparatus 5, a CPU 79 for controlling the image output apparatus 8, an image data memory 80 consisting of multiple frame memories for storing image data input from the image processing apparatus 8, a D/A converter 81 for converting the image data into an analog signal, laser beam irradiating means 82 and modulator drive means 83 for outputting modulation signals for modulating the intensities of the laser beams produced by the laser beam irradiating means 82. The CPU 79 can communicate with the CPU 60 of the image processing apparatus 5 via a communication line (not shown).

Figure 8:
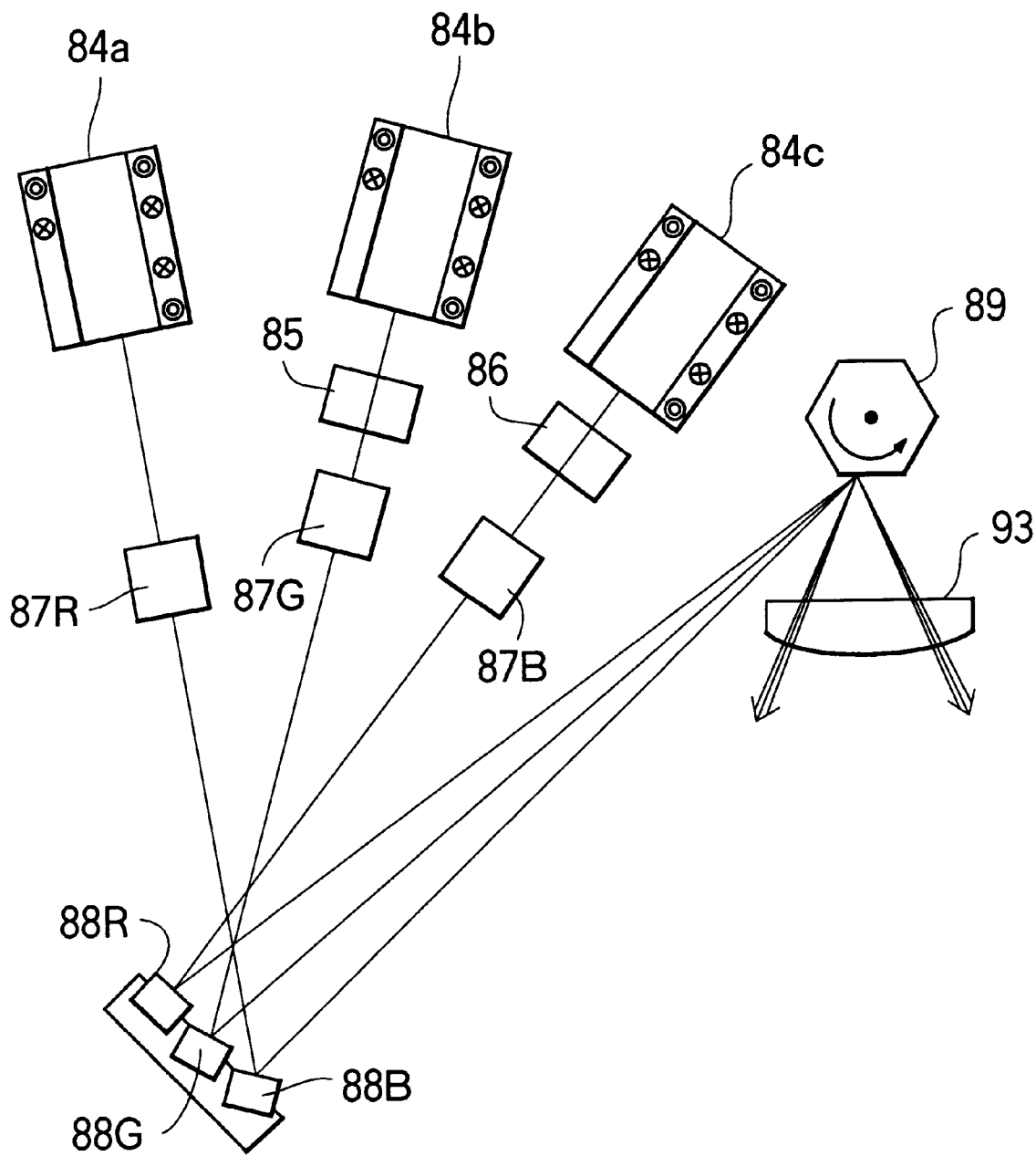
FIG. 8 is a schematic view of laser beam irradiating means of the image output apparatus.

FIG. 8 is a schematic view of the laser beam irradiating means 82. The laser beam irradiating means 82 has semiconductor laser beam sources 84a, 84b, 84c for producing red laser beams. The laser beam emitted by the semiconductor laser beam source 84b is converted to a green laser beam by wavelength converting means 85 and the laser beam emitted by the semiconductor laser beam source 84c is converted to a blue laser beam by wavelength converting means 86. The red laser beam emitted by the laser beam source 84a, the green laser beam wavelength-converted by the wavelength converting means 85 and the blue laser beam wavelength-converted by the wavelength converting means 86 enter light modulators 87R, 87G, 87B, which can be acousto-optic modulators (AOMs) or the like. The light modulators 87R, 87G, 87B are each input with a modulation signal from the modulator drive means 83 and modulate the intensities of the laser beams in accordance with the modulation signals. The laser beams modulated in intensity by the light modulators 87R, 87G, 87B are reflected onto a polygonal mirror 89 by reflecting mirrors 88R, 88G, 88B.

The image output apparatus 8 is equipped with a magazine 91 for accommodating a roll of color photographic paper 90 which is conveyed along a prescribed conveyance path running in the sub-scanning direction. Perforating means 92 is installed on the conveyance path of the color photographic paper 90 for perforating reference holes in the edge of the color photographic paper 90 at intervals corresponding to the length of the individual color prints on which color images are to be reproduced. The reference holes are used for synchronizing the conveyance of the color photographic paper 90 with the operation of other means of the image output apparatus 8.

The laser beams modulated by the light modulators 87R, 87G, 87B are deflected by the polygonal mirror 89, pass through an fθ lens 93 and expose the whole surface of the color photographic paper 90 by scanning it in the main scanning direction while it is being conveyed in the sub-scanning direction. The CPU 79 controls the conveyance speed of the color photographic paper 90 in the sub-scanning direction to synchronize it with the rotational speed of the main scanning direction, i.e., with the rotational speed of the polygonal mirror 89.

The color photographic paper 90 exposed by the laser beams is forwarded to a developing section having a color developing tank 94, a bleach-fixing tank 95 and a washing tank 96, where it is subjected to prescribed color development, bleach-fixing and washing, thereby reproducing on the color photographic paper 90 one or more color images based on the image data image-processed by the image processing apparatus 5. The color photographic paper 90 is then sent to a drying section 97 where it is dried, to a cutter 98 controlled based on the reference holes perforated in the edge of the color photographic paper 90 to operate synchronously with the conveyance of the color photographic paper 90 so as to cut it into lengths each corresponding to the length of one image recorded in one frame of the film F or one color print P, and to a sorter 99 which sorts the cut pieces based on the individual rolls of the film F or by customer.

The color developing tank 94, the bleach-fixing tank 95, the washing tank 96, the drying section 97, the cutter 98 and the sorter 99 can be of the same type as used in an ordinary automatic developing machine.

FIG. 9 is a block diagram showing the particulars of the first image processing means 61. As shown in FIG. 9, the first image processing means 61 comprises color density gradation converting means 100 for converting the color signal level, density signal level and gradation signal level of the input image data, color saturation converting means 101 for converting color saturation data of the image data, digital magnification converting means 102 for converting the number of pixels of the image data, frequency processing means 103 for frequency-processing the image data and dynamic range converting means 104 for converting the dynamic range of the image data.

The thus constituted color image reproducing system including the image processing apparatus 5 which is an embodiment of the present invention reads color images recorded on films F or color prints P, generates image data, effects image processing on the image data and continuously reproduces color images recorded on a plurality of films F or a plurality of color prints P on a color photographic paper 90 in following manner.

In the case of reproducing a color image recorded on a negative, reversal or other such film F, the transmission type image read-out apparatus 10 is connected through its interface 21 with the interface 48 of the image processing apparatus 5 and the film F is set in the carrier 22. When the film F has been set in the carrier 22, the CPU 60 outputs a drive signal to the motor 23 and the motor 23 drives the rollers 24. As result, the film F is conveyed in the direction of the arrow. The picture region detection sensor 25 detects the density distribution of the film F and outputs the result of the detection to the CPU 26 as a density signal. Based on this density signal, the CPU 26 detects the picture position of the color image and when it finds that the picture of the color image has reached the prescribed position, it stops the motor 23. As a result, the color image recorded on the film F is stopped at a prescribed picture position relative to the CCD area sensor 15 and the lens 16. The light source 11 then emits light at a prescribed time thereafter and the light regulating unit 12 regulates the quantity of the light passed in the direction of the film F.

In the transmission type image read-out apparatus 10, the light emitted from the light source 11 is adjusted to a prescribed quantity by the light regulating unit 12 and then separated into three colors, red (R), green (G) and blue (B), by the color separation unit 13. The film F is first irradiated with red (R) light, then with green (G) light and finally blue (B) light. The light transmitted through the film F is photoelectrically read by the CCD area sensor 15 to generate R image data, G image data and B image data and they are progressively transferred to the image processing apparatus 5. Therefore, the transmission type image read-out apparatus 10 first irradiates the film F with red (R) light to produce R image data corresponding to one frame of the film F and transfers them to the image processing apparatus 5. It then irradiates the film F with green (G) light to produce G image data corresponding to one frame of the film F and transfers them to the image processing apparatus 5. It finally irradiates the film F with blue (B) light to produce B image data corresponding to one frame of the film F and transfers them to the image processing apparatus 5.

In this embodiment, the color image recorded in a single frame of the film F is read out twice. The image data obtained by the first read-out (preliminary read-out) are used as a basis for deciding the image read-out conditions in the second read-out (main read-out). Specifically, the main read-out is conducted after adjustment of the quantity of light directed onto the film F by the light regulating unit 12 and the adjustment of the storage time of the CCD area sensor 15.

In the preliminary read-out, the CCD area sensor 15 is controlled by the CPU 26 so as to transfer the image data corresponding to only a single odd field or even field of the color image to the amplifier 17. The number of lines of the image data corresponding to an odd field or an even field is half of that of the image data read by the CCD area sensor 15 and the number of pixels is also half of that of the image data read by the CCD area sensor 15.

The image data produced by the CCD area sensor 15 and corresponding to an odd field or an even field are amplified by the amplifier 17 and converted to digital signals by the A/D converter 18. The image data converted to digital signals are corrected for dark current and variance in sensitivity among the individual pixels by the CCD correcting means 19 and then converted to density data by the logarithmic converter 20, whereafter the image data are sent line by line to the image processing apparatus 5 through the interface 21 and the interface 48 in order of R image data of one frame, G image data of one frame and B image data of one frame.

The image data input to the image processing apparatus 5 are first input to the data processing section 47. When the input image data have been obtained by reading a color image recorded on a reversal film F, the data processing section 47 effects negative-positive reversal processing on the image data and outputs the processed image data to the arithmetic average computing means 49. On the other hand, when the input image data have been obtained by reading a color image recorded on a negative film F, the data processing section 46 outputs the image data to the arithmetic average computing means 49 without effecting any processing thereon.

Upon receiving R image data from the data processing section 47, the arithmetic average computing means 49 sums and averages the values of sets of two adjacent pixels of the R image data and defines the average values as single pixels, thereby reducing the number of pixels per line of the image data to ½.

The CPU 60 then stores only pixels in one set of odd lines and even lines of the R image data alternately in the first line buffer 50a and the second line buffer 50b. Specifically, it stores odd numbered pixels in one set of odd lines and even lines of the R image data in one of the first line buffer 50a and the second line buffer 50b and even numbered pixels in one set of odd lines and even lines of the R image data in the other. Therefore, since only pixels in one set of odd lines and even lines of the R image data among the R image data output from the arithmetic average computing means 49 are transferred to the first line buffer 50a and the second line buffer 50b, the number of lines of the image data stored in the first line buffer 50a and the second line buffer 50b is reduced to ½.

During the preliminary read-out, the CPU 60 connects one of the first line buffer 50a and the second line buffer 50b and the first frame memory unit 51 to the input bus 63 and disconnects the second frame memory unit 52 and the third frame memory unit 53 from the input bus 63. Therefore, only the R image data stored in one of the first line buffer 50a and the second line buffer 50b, namely, only the odd numbered pixels in one set of odd lines and even lines or the even numbered pixels in one set of odd lines and even lines of the R image data are progressively transferred as preliminary read-out image data to the first frame memory unit 51. As a result, the number of pixels in each line of the R image data is reduced to ½. In this way, the number of pixels corresponding to the color image recorded in one frame of the film F is finally reduced to ¹⁄₁₆ and the pixels of the R image data are stored in the R data memory 51R of the first frame memory unit 51.

Then, the same processing is effected on the G image data and the B image data, thereby reducing the number of pixels of the respective image data to ¹⁄₁₆ and the respective pixels are stored in the G data memory 51G or the B data memory 51B of the first frame memory unit 51.

On the other hand, in the case of reproducing a color image recorded on a color print P, the reflection type image read-out apparatus 30 is connected through its interface 41 with the interface 48 of the image processing apparatus 5 and the color print P is set in a carrier (not shown). Light emitted by the light source 31 is reflected from the surface of the color print P, is reflected by the mirror 32, passes through the color balance filter 33, which adjusts its R, G, B sensitivity, and is adjusted in quantity by the light regulating unit 34. Similarly to what was explained earlier, in the preliminary read-out, light emitted by the light source 31 is regulated to a prescribed quantity by the light regulating unit 34 and is received and photoelectrically read by the CCD line sensor 35 constituted by three line sensors corresponding to R, G, B. At this time, the light source 31 and the mirror 32 are moved at a prescribed speed in the direction of the arrow, i.e., the sub-scanning direction, by a drive means (not shown). As a result, the color image recorded on the color print P held in the carrier (not shown) is two dimensionally read out and the CCD line sensor 35 generates image data corresponding to R, G, B. Since the speed of the light source 31 and the mirror 32 during the preliminary read-out is set to twice that during the main read-out, the number of pixels of the image data produced by the reflection type image read-out apparatus 30 during the preliminary read-out in the sub-scanning direction is half of that during the main read-out.

R image data, G image data and B image data corresponding to R, G, B generated by the CCD line sensor 35 are amplified by the amplifier 37 and converted to digital signals by the A/D converter 38. The image data converted to digital signals are corrected for dark current and variance in sensitivity among the individual pixels by the CCD correcting means 39 and then converted to density data by the logarithmic converter 40, whereafter the image data are sent pixel by pixel to the image processing apparatus 5 through the interface 41 and the interface 48.

The image data transferred from the reflection type image read-out apparatus 30 are input to the data processing section 47 of the image processing apparatus 5 where the number of bits of the image data is changed by use of lookup tables from twelve bits to ten bits which is the number of bits of the image data transferred from the transmission type image read-out apparatus 10 and the image data is subjected to negative-positive reversal processing.

The image data whose number of bits has been altered and which have been subjected to negative-positive reversal processing are output from the data processing section 47 to the arithmetic average computing means 49. Upon receiving the image data, the arithmetic average computing means 49 sums and averages the values of two adjacent pixels of the R image data, those of two adjacent pixels of the G image data and those of two adjacent pixels of the B image data and defines the average values as single pixels respectively, thereby reducing the number of pixels per line of the respective image data.

Then, the CPU 60 stores only pixels in one set of odd lines and even lines of the R image data alternately in the first line buffer 50a and the second line buffer 50b, only pixels in one set of odd lines and even lines of the G image data alternately in the first line buffer 50a and the second line buffer 50b and only pixels in one set of odd lines and even lines of the B image data alternately in the first line buffer 50a and the second line buffer 50b. More specifically, the CPU 60 stores odd numbered pixels in one set of odd lines and even lines of the R image data in one of the first R line buffer 50aR and the second R line buffer 50bR and even numbered pixels in one set of odd lines and even lines of the R image data in the other, stores odd numbered pixels in one set of odd lines and even lines of the G image data in one of the first G line buffer 50aG and the second G line buffer 50bG and even numbered pixels in one set of odd lines and even lines of the G image data in the other and stores odd numbered pixels in one set of odd lines and even lines of the B image data in one of the first B line buffer 50aB and the second B line buffer 50bB and even numbered pixels in one set of odd lines and even lines of the B image data in the other. Therefore, the image data in one set of odd lines and even lines of the R, G, B image data output from the arithmetic average computing means 49 are stored in the first R line buffer 50aR, the first G line buffer 50aG and the first B line buffer 50aB and the image data in the other line are transferred into the second R line buffer 50bR, the second G line buffer 50bG and the second B line buffer 50bB, thereby reducing the number of lines of the R, G, B image data stored in the first R line buffer 50aR, the first G line buffer 50aG, the first B line buffer 50aB, the second R line buffer 50bR, the second G line buffer 50bG and the second B line buffer 50bB to ½.

During the preliminary read-out, the CPU 60 connects either a first set of line buffers constituted by the first R line buffer 50aR, the first G line buffer 50aG and the first B line buffer 50aB or a second set of line buffers constituted by the second R line buffer 50bR, the second G line buffer 50bG and the second B line buffer 50bB and the first frame memory unit 51 with the input bus 63 and disconnects the second frame memory unit 52 and the third frame memory unit 53 from the input bus 63. Therefore, only the image data stored in one of the first set of line buffers constituted by the first R line buffer 50aR, the first G line buffer 50aG and the first B line buffer 50aB and the second set of line buffers constituted by the second R line buffer 50bR, the second G line buffer 50bG and the second B line buffer 50bB, namely, only odd numbered pixels in one set of odd lines and even lines of the R, G, B image data or even numbered pixels in the other line of the R, G, B image data, are progressively transferred as the preliminary read-out image data to the R data memory 51R, the G data memory 51G and the B data memory 51B of the first frame memory unit 51. As a result, the number of pixels corresponding to the color image recorded on one color print P is finally reduced to 1/16 and the respective image data corresponding to R, G, B are stored in the R data memory 51R, the G data memory 51G and the B data memory 51B of the first frame memory unit 51. In this way, the image data corresponding to the color image recorded on one color print P and forwarded pixel by pixel from the reflection type image read-out apparatus 30 are selectively stored in the R data memory 51R, the G data memory 51G or the B data memory 51B of the first frame memory unit 51.

The image data thus read out by the preliminary read-out and stored in the first frame memory unit 51 are forwarded through the data bus 65 to the CPU 60 for analysis. Based on the image data obtained by the preliminary read-out, the CPU 60 generates a read-out control signal for optionally conducting the main read-out in light of the dynamic range of the CCD area sensor 15 or the CCD line sensor 35 and forwards the read-out control signal through the data bus 65 to the CPU 26 of the transmission type image read-out apparatus 10 or the CPU 46 of the reflection type image read-out apparatus 30. In addition, the CPU 60 automatically decides the main read-out conditions for enabling an image of optimum density, gradation and tone to be reproduced on the color photographic paper 90 based on the image data obtained by the main read-out.

Based on the read-out control signal received from the CPU 60, the CPU 26 of the transmission type image read-out apparatus 10 or the CPU 46 of the reflection type image read-out apparatus 30 controls the light regulating unit 12 or the light regulating unit 34 during the main read-out so that the film F is irradiated with the prescribed quantity of light or the CCD line sensor 35 receives the prescribed quantity of reflected light from the color print P. The CPU 26 or the CPU 46 also adjusts the storage time of the CCD area sensor 15 or the CCD line sensor 35.

If required, the CPU 60 at the same time forwards control signals through the data bus 65 to the first image processing means 61 and the second image processing means 62 so as to adjust the image processing parameters and other image processing conditions in line with the results of the analysis of the image data read out in the preliminary read-out.

Further, the image data obtained by the preliminary read-out and stored in the first frame memory unit 51 are sent to the second image processing means 62, which subjects them to gradation correction, color conversion, density conversion and other such image processing by use of lookup tables or matrix computation, and are then sent through the data bus 65 to the image displaying apparatus to display a color image on the screen of the CRT 68.

Upon viewing the color image displayed on the screen of the CRT 68, the operator can, if necessary, use the keyboard 69 to adjust the image read-out conditions for the main read-out and/or the image processing conditions. When the operator uses the keyboard 69 to input an instruction signal to adjust the image read-out conditions and/or the image processing conditions for the main read-out, the instruction signal from the keyboard 69 is input to the CPU 60 through the data bus 65. Based on the instruction signal, the CPU 60 generates a control signal which it sends through the data bus 65 to the CPU 26 of the transmission type image read-out apparatus 10 or the CPU 46 of the reflection type image read-out apparatus 30, and/or the first image processing means 61, and/or the second image processing means 62 so as to adjust the image read-out conditions and/or the image processing conditions.

In the present embodiment, since the data bus is formed independently of the input and output buses 63, 64 of the first frame memory unit 51, the second frame memory unit 52 and the third frame memory unit 53, the operator can input various instruction signals or display a color image on the screen of the CRT 68 even during input or output of image data to or from the first memory unit 51, the second frame memory unit 52 or the third frame memory unit 53.

Once the image read-out conditions and/or the image processing conditions for the main read-out have been decided from the results of the preliminary read-out, the main read-out is conducted.

In the main read-out, the CCD area sensor 15 of the transmission type image read-out apparatus 10 generates an odd field and an even field of image data of the color image recorded in one frame of the film F corresponding to red (R), green (G) and blue (B) and the odd field and the even field of image data corresponding to red (R), green (G) and blue (B) are input every color and frame by frame through the interface 21 and the interface 48 to the image processing apparatus 5. The CCD line sensor 35 of the reflection type image read-out apparatus 30 reads the color image recorded on a single color print P at a low sub-scanning speed to generate image data and the image data corresponding to red (R), green (G) and blue (B) are input color by color and pixel by pixel through the interface 41 and the interface 48 to the image processing apparatus 5.

The image data input to the image processing apparatus 5 are first input to the data processing section 47. When the image data have been obtained by reading a color image recorded on a reversal film F, the data processing section 47 effects negative-positive reversal processing on the image data and outputs them to the arithmetic average computing means 49. On the other hand, when the image data have been obtained by reading a color image recorded on a negative film F, the data processing section 47 outputs them to the arithmetic average computing means 49 without effecting any processing. Further, when the image data have been transferred from the reflection type image read-out apparatus 30, the data processing section 47 alters, based on lookup tables, the number of bits of the image data from twenty bits to ten bits which is the number of bits of the image data forwarded from the transmission type image read-out apparatus 10 and effects negative-positive reversal processing on the image data to output them to the arithmetic average computing means 49.

The arithmetic average computing means 49 does not carry out any addition processing on the image data during the main read-out but instead forwards all input image data to the first R line buffer 50aR, the second G line buffer 50aG, the first B line buffer 50aB, the second R line buffer 50bR, the second G line buffer 50bG and the second B line buffer 50bB. The image data are stored alternately in the first set of line buffers constituted by the first R line buffer 50aR, the first G line buffer 50aG and the first B line buffer 50aB and the second set of line buffers constituted by the second R line buffer 50bR, the second G line buffer 50bG and the second B line buffer 50bB and after temporarily stored therein, they are stored in the second frame memory unit 52 or the third frame memory unit 53. When the operator has input an instruction signal through the keyboard 69 requesting that color images recorded on one negative film, one reversal film or a group of color prints received from the customer be reproduced as color images having uniform tone, gradation, density and the like as a whole, the image data stored in the second frame memory unit 52 or the third frame memory unit 53 are stored in the hard disk 67. The main read-out of a color image recorded in the next frame of the film F or a color image recorded on the next color print P is further conducted and image data produced by the main read-out are stored in the hard disk 67. Thus, color images recorded on one negative film, one reversal film or a group of color prints received from the customer are read out by the main read-out and the generated image data are stored in the hard disk 67.

The image data corresponding to red (R), green (G) and blue (B) and generated by the transmission type image read-out apparatus 10 are progressively forwarded every color and frame by frame to the image processing apparatus 5. Therefore, when the R image data are forwarded to the image processing apparatus 5, the CPU 60 stores them alternately in the first R line buffer 50aR and the second R line buffer 50bR and after temporarily storing them therein, it stores them in the R data memory 52R of the second frame memory unit 52 or the R data memory 53R of the third frame memory unit 53.

Similarly, the CPU 60 stores the G image data alternately in the first G line buffer 50aG and the second G line buffer 50bG and stores the B image data alternately in the first B line buffer 50aB and the second B line buffer 50bB. After they were temporarily stored therein, the CPU 60 stores the G image data in the G data memory 52G of the second frame memory unit 52 or the G data memory 53G of the third frame memory unit 53 and stores the B image data in the B data memory 52B of the second frame memory unit 52 or the B data memory 53B of the third frame memory unit 53.

The CPU 60 stores the image data forwarded every color pixel by pixel from the reflection type image read-out apparatus 30 so that the R image data are stored alternately in the first R line buffer 50aR and the second R line buffer 50bR, the G image data are stored alternately in the first G line buffer 50aG and the second G line buffer 50bG and that the B image data are stored alternately in the first B line buffer 50aB and the second B line buffer 50bB.

Accordingly, in the image processing apparatus 5 according to the present embodiment, the CPU 60 separates the R, G, B image data forwarded from the reflection type image read-out apparatus 30 into data corresponding to respective colors and stores them in corresponding line buffers in such a manner that a first pixel of the R image data first forwarded from the reflection type image read-out apparatus 30 is stored in the first R line buffer 50aR, a first pixel of the G image data next forwarded is stored in the first G line buffer 50aG, a first pixel of the B image data third forwarded is stored in the first B line buffer 50aB, a second pixel of the R image data fourth forwarded is stored in the second R line buffer 50bR, a second pixel of the G image data fifth forwarded is stored in the second G line buffer 50bG, a second pixel of the B image data sixth forwarded is stored in the second B line buffer 50bB and so on.

Further, the image data stored in the first R line buffer 50aR and the second R line buffer 50bR are transferred to and stored in the R data memory 52R of the second frame memory unit 52 or the R data memory 53R of the third frame memory unit 53, the image data stored in the first G line buffer 50aG and the second G line buffer 50bG are transferred to and stored in the G data memory 52G of the second frame memory unit 52 or the G data memory 53G of the third frame memory unit 53, and the image data stored in the first B line buffer 50aB and the second B line buffer 50bB are transferred to and stored in the B data memory 52B of the second frame memory unit 52 or the B data memory 53B of the third frame memory unit 53.

The image data stored in the second frame memory unit 52 or the third frame memory unit 53 are stored in the hard disk 67. The main read-out of a color image recorded in the next frame of the film F or a color image recorded on the next color print P is further conducted and image data produced by the main read-out are stored in the hard disk 67.

Thus, when color images recorded on one negative film, one reversal film or a group of color prints received from the customer have been read out by the main read-out and the generated image data have been stored in the hard disk 67, the CPU 60 outputs the respective image data stored in the hard disk 67 to the first image processing means 61 and causes the first image processing means 61 to effect image processing in accordance with image processing conditions determined in advance or image processing conditions changed as a result of the preliminary read-out thereon. In the first image processing means 61, density data, tone data and gradation data of the image data are converted in accordance with lookup tables by the color density gradation converting means 100 and color saturation data of the image data are converted in accordance with matrix computation by the color saturation converting means 101. The image data are further subjected to frequency processing such as edge enhancement by the frequency processing means 103 and the number of pixels thereof is reduced by the digital magnification converting means 102, since the number of the image data stored in the hard disk 67, which correspond to color images recorded on one negative film, one reversal film or a group of color prints received from the customer, is extremely great and color images cannot be displayed on the screen of the CRT 68 based on such image data. The image data which have been subjected to image processing in this manner and whose number of pixels has been reduced are progressively forwarded to the CRT 68 and when all image data corresponding to color images recorded on one negative film, one reversal film or a group of color prints received from the customer have been transferred to the CRT 68, a plurality of color images are simultaneously reproduced on the screen of the CRT 68 based on the image data. The operator views the plurality of color images displayed on the screen of the CRT 68 and compares their tone, density, gradation and the like. The operator then inputs image processing conditions through the keyboard 69 to change the image processing conditions in accordance with the customer's request so that the color images having uniform tone, density, gradation and the like as a whole can be reproduced based on the color images recorded on one negative film, one reversal film or a group of color prints received from the customer. When the image processing conditions have been changed, the CPU 60 progressively outputs again the image data stored in the hard disk 67 and corresponding to the color images recorded on one negative film, one reversal film or a group of color prints received from the customer to the first image processing means 61 and after it has caused the first image processing means 61 to effect image processing on the image data based on the altered image processing conditions and to reduce the number of pixels of the image data, it progressively forwards the image data to the CRT 68, thereby reproducing a plurality of color images corresponding to the color images recorded on one negative film, one reversal film or a group of color prints received from the customer on the screen of the CRT 68.

When the operator judges based on the plurality of color images reproduced on the screen of the CRT 68 in this manner that the color images recorded on one negative film, one reversal film or a group of color prints received from the customer can be reproduced as color images having uniform tone, density, gradation and the like as requested by the customer, the operator inputs an instruction signal through the keyboard 69 requesting reproduction of color images. When the instruction signal requesting to reproduce color images is input through the keyboard 69, the image data stored in the hard disk 67, which were obtained by the main read-out and image-processed by the first image processing means 61, are progressively read out to the first image processing means 61 and are subjected to image processing based on the original image processing conditions by the first image processing means 61 and after the number of pixels of the image data has been increased or reduced by the digital magnification converting means 102 to be compatible with the size of the color image to be output on the color photographic paper 90, the image data are progressively output to the image output apparatus 8 via the data synthesizing means 75.

If the operator inputs an instruction signal through the keyboard 69 indicating that the image data obtained by reading out the color image is to be merged with other data, the CPU 60 outputs a data merge signal to the data synthesizing means 75 and the data synthesizing means 75 reads the graphic, character or other image data to be merged from the merge data memory 76 and synthesizes it with the image data obtained by reading out the color image. On the other hand, if no such a instruction signal is input through the keyboard 69, no further processing is conducted and the image data are output from the data synthesizing means 75 to the image output apparatus 8.

When the image data are input to the image output apparatus 8 from the data synthesizing means 75 of the image processing apparatus 5 through the interface 77 and the interface 78, the image data are stored in image data memory 80 consisting of multiple frame memories. Since the operation of read out of a color image recorded on a film F or a color image recorded on a color print P is not synchronized with the operation of the image output apparatus 8, the image data read out by the image read-out apparatus 1 and image-processed by the image processing apparatus 5 are input to the image output apparatus 8 without any relation to the processing in the image output apparatus 8. In the present embodiment, therefore, the image output apparatus 8 is equipped with the image data memory 80 whose multiple frame memories progressively store the image data input from the image processing apparatus 5. This arrangement ensures the ability of the image output apparatus 8 to reproduce color images on the color photographic paper 90 at the prescribed speed even when it is receiving image data being read out by the image read-out apparatus 1 at a high speed.

The operations of the various means of the image output apparatus 8 are synchronized by the CPU 79. In synchronism with the drawing the color photographic paper 90 from the magazine 91 and the conveyance thereof along the prescribed conveyance path, the image data are read from the image data memory 80, converted to analog signals by the D/A converter 81 and input to the modulator drive means 83 to generate modulated signals. Meanwhile, the red laser beam emitted by the semiconductor laser beam source 84a, the laser beam emitted by the semiconductor laser beam source 84b and converted to a green laser beam by the wavelength converting means 85 and the laser beam emitted by the semiconductor laser beam source 84c and converted to a blue laser beam by the wavelength converting means 86 enter the modulator 87R, modulator 87G and modulator 87B. The modulators 87R, 87G and 87B modulates the intensities of the respective beams in accordance with the modulation signals input thereto from the modulator drive means 83, i.e., in accordance with the image data, and the intensity-modulated laser beams are reflected by the reflecting mirrors 88R, 88G, 88B onto the polygonal mirror 89. The polygonal mirror 89 is rotated at a prescribed speed. The laser beams are deflected by the rotating polygonal mirror 89, pass through the fθ lens 93 and scan the surface of the color photographic paper 90 being conveyed in the sub-scanning direction. As a result, the color photographic paper 90 is scanned two-dimensionally by R, G and B laser beams. Since conveyance of the color photographic paper 90 in the sub-scanning direction is synchronized with the rotation of the polygonal mirror 89, the color photographic paper 90 is exposed to the laser beams congruously with the color image recorded on the film F or the color print P.

The color photographic paper 90 exposed to the laser beams in this manner is forwarded to the developing tank 94, developed, bleach-fixed tank in the bleach-fixing tank 95 and washed in the washing tank 96, thereby reproducing on the color photographic paper 90 one or more color images based on the image data image-processed by the image processing apparatus 5. The developed, bleach-fixed and washed color photographic paper 90 is forwarded to the drying section 97 to be dried, to the cutter 98 controlled based on the reference holes perforated in the edge of the color photographic paper 90 so as to cut it into lengths each corresponding to the length of one color image recorded in one frame of the film F or one color print P, and to a sorter 99 which sorts the cut pieces based on the individual rolls of the film F or by customer.

According to the above described embodiment, when the operator has input an instruction signal through the keyboard 69 requesting reproduction of color images recorded on one negative film, one reversal film or a group of color prints received from the customer as color images having uniform tone, gradation, density and the like as a whole, the image processing apparatus 5 progressively stores image data obtained by the main read-out of the color images recorded on one negative film, one reversal film or a group of color prints received from the customer in the hard disk 67 and when all image data produced by the main read-out of the color images recorded on one negative film, one reversal film or a group of color prints received from the customer have been stored in the hard disk 67, the image data are progressively forwarded to the first image processing means 61. The image processing apparatus 5 effects image processing on the image data based on predetermined image processing conditions or those altered as a result of the preliminary read-out and reduces the number of pixels of the image data. Based on the image data, the image processing apparatus 5 displays on the screen of the CRT 68 a plurality of color images corresponding to the color images recorded on one negative film, one reversal film or a group of color prints received from the customer so that the operator can view them and change the image processing conditions. Accordingly, based on the color images displayed on the screen of the CRT 68, the operator can set image processing conditions and cause the image processing apparatus 5 to effect image processing on the image data so that the color images recorded on one negative film, one reversal film or a group of color prints received from the customer can be reproduced as color images having uniform tone, gradation, density and the like as a whole and it is therefore possible, in accordance with the customer's request, to reproduce the color images recorded on one negative film, one reversal film or a group of color prints received from the customer on the color photographic paper 90 as color images having uniform tone, gradation, density and the like.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the image data produced by the reflection type image read-out apparatus 30 are transferred pixel by pixel to the image processing apparatus 5. However, if the format altering means is constituted so as to selectively store R, G, B image data transferred line by line in the first frame memory unit 51 including the R data memory 51R, the G data memory 51G and the B data memory 51B, the second frame memory unit 52 including the R data memory 52R, the G data memory 52G and the B data memory 52B, and the third frame memory unit 53 including the R data memory 53R, the G data memory 53G and the B data memory 53B, image data can be transferred line by line every color to the image processing apparatus 5 from the reflection type image read-out apparatus 30 in such a manner that R image data in a first line, G image data in a first line and B image data in a first line are first transferred, R image data in a second line, G image data in a second line and B image data in a second line are secondly transferred and so on.

Further, in the above described embodiment, the CPU 26 or the CPU 46 uses the image data obtained by the preliminary read-out as the basis for adjusting the quantity of light in the main read-out by controlling the light regulating unit 12 or the light regulating unit 34 and also for controlling the storage time of the CCD area sensor 15 or the CCD line sensor 35. However, it is instead possible in the main read-out only to adjust the quantity of light by controlling the light regulating unit 12 or the light regulating unit 34 or only to control the storage time of the CCD area sensor 15 or the CCD line sensor 35. In addition or instead, moreover, it is possible to control the clock speed of the CCD area sensor 15 or the CCD line sensor 35.

Further, in the above described embodiment, the first image processing means 61 is provided with the color density gradation converting means 100, the color saturation converting means 101, the digital magnification converting means 102, the frequency processing means 103 and the dynamic range converting means 104 and the image data input thereto are subjected to color density gradation conversion, color saturation conversion, magnification conversion, frequency processing and dynamic range conversion in this order. However, if magnification conversion is carried out before frequency processing, the order of the image processing by the other processing means can be changed as desired.

Furthermore, in the above described embodiment, the image processing apparatus 5 reproduces, in accordance with the customer's request, color images recorded on one negative film, one reversal film or a group of color prints received from the customer on the color photographic paper 90 as color images having uniform tone, gradation, density and the like. However, if the customer requests, color images recorded on one strip of a negative film or reversal film may be reproduced on the color photographic paper 90 as color images having uniform tone, gradation, density and the like. In the case where only color images recorded on one strip of a negative film or reversal film are reproduced on the color photographic paper 90 as color images having uniform tone, gradation, density and the like, it is sufficient for the hard disk 67 to have a memory capacity capable of storing image data obtained by reading out the color images recorded on one strip of a negative film or reversal film.

Moreover, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image processing apparatus used with a color image reproducing system for photo-electrically reading out a color image, converting so-obtained image data to digital signals to be stored in image data storing means, effecting image processing on the image data stored in the image storing means and reproducing a color image, specifically such an image read-out apparatus capable of reproducing a plurality of color images so that color images having uniform tone, gradation, density and the like as a whole can be reproduced.

I claim:

1. An image processing apparatus for a color image reproducing system comprising:

image data storing means for storing image data from photoelectrically reading out a plurality of color images recorded on a single photographic recording medium;

image processing means for processing the image data stored in the image data storing means and reducing the number of pixels of a preliminary class of the image data by a pixel averaging technique to yield reduced data, the image processing means responsive to image processing conditions;

color image displaying means for simultaneously displaying the plurality of color images based on the reduced data; and altering means for individually altering the image processing conditions of the simultaneously displayed color images to adjust appearance parameters to make them uniform among the plurality of images recorded on the single photographic recording medium.

2. An image processing apparatus in accordance with claim 1, wherein the color image displaying means reproduces the color images based on the image data processed in accordance with the image processing conditions altered by the condition altering means; wherein the photographic medium is selected from the group consisting of a film and a print.

3. The image processing apparatus according to claim 1 wherein the appearance parameters are selected from the group consisting of tone, gradation, density, and color.

4. An image processing apparatus for a color image reproducing system comprising:

image data storing means for storing image data from photoelectrically reading out a plurality of color images recorded on a single photographic recording medium;

image processing means for processing the image data stored in the image data storing means and reducing the number of pixels of a preliminary class of the image data by a pixel averaging technique to yield reduced data, the image processing means responsive to image processing conditions;

color image displaying means for simultaneously displaying the plurality of color images based on the reduced data; and altering means for altering image processing conditions of the image Processing means based upon a prior visual interpretation of the reduced data, to adjust appearance parameters to make them uniform among the plurality of images recorded on the single photographic recording medium; and a read-out apparatus coupled to the image processing means, the image processing means adapted to control a storage time of the read-out apparatus based upon the prior visual interpretation.

5. An image processing apparatus for a color image reproducing system comprising:

image data storing means for storing image data from photoelectrically reading out a plurality of color images recorded on a single photographic recording medium;

image processing means for processing the image data stored in the image data storing means and reducing the number of pixels of a preliminary class of the image data by a pixel averaging technique to yield reduced data, the image processing means responsive to image processing conditions;

color image displaying means for simultaneously displaying the plurality of color images based on the reduced data; and altering means for altering image processing conditions of the image processing means based upon a prior visual interpretation of the reduced data, to adjust appearance parameters to make them uniform among the plurality of images recorded on the single photographic recording medium; and a charge coupled device coupled to the image processing means and a light-regulating unit for controlling an intensity of light available for the charge-coupled device based upon the prior visual interpretation.

6. The image processing apparatus according to claim 1 wherein the image processing means is adapted to reduce the pixels into a compressed matrix by grouping and averaging the image data of the pixels.

7. A method of processing a color image, in a color image reproducing system, to produce an output image on an output medium, the method comprising the steps of:

reading image data by photoelectrically scanning a plurality of color images via read-out apparatus, the reading including establishing Preliminary read-out conditions for the reading of the image data and adjusting the preliminary read-out conditions of the image read-out apparatus during the reading of the image data;

storing the read image data in a storage medium;

reducing the number of pixels stored by grouping the pixels into groups and averaging the image data associated with each pixel within a group to yield representative pixel datum; and altering final read-out conditions to improve uniformity of the appearance of the output image.

8. The method according to claim 7 further comprising the step of displaying a plurality of color images based upon the image data with the reduced number of pixels.

9. The method according to claim 7, further comprising the step of processing the stored image data, including optimizing reproduction of the color image on the output medium through the following substeps:

correcting gradation of the stored image data by a matrix computation to replace a preliminary color gradation with a final color gradation calculated from the matrix computation;

correcting color conversion of the stored image data by a matrix computation to replace a preliminary color conversion with a final color conversion calculated from the matrix computation; and correcting density of the stored image data by a matrix computation to replace a preliminary density with a final density calculated from the matrix computation.

10. The method according to claim 7 wherein the altering step comprises the following substeps:

establishing final read-out conditions based upon information fed back from the reading of the image data in accordance with the preliminary read-out conditions; and adjusting the preliminary read-out conditions of the image read-out apparatus to the final read-out conditions, wherein the image data is read by photoelectrically scanning the plurality of color images via the read-out apparatus, based upon the adjusted final read-out conditions.

11. The method according to claim 10 wherein the read-out apparatus includes a charge-coupled device (CCD), and wherein the preliminary read-out conditions and the final read-out conditions include light intensity of the CCD.

12. The method according to claim 10 wherein the preliminary read-out conditions and the final read-out conditions include light illuminating duration of a charge-coupled device (CCD) of the read-out apparatus.

13. The method according to claim 7 wherein the step of reducing the number of pixels stored further includes arranging the stored image data into at least one matrix of pixels in the storage medium, the method further comprising the step of:

processing only every other line of a matrix in the storage medium to yield a compressed matrix.

14. The method according to claim 13 wherein the step of processing further comprises:

processing only every other pixel in each line of the compressed matrix to further lower the number of pixels used.

15. The method according to claim 7, further comprising the step of processing the stored image data, including optimizing reproduction of the color image on the output medium through the following substeps:

correcting gradation of the stored image data by accessing a look-up table and substituting a preliminary color gradation with a final color gradation found in the look-up table;

correcting color conversion of the stored image data by accessing a lookup table and substituting a preliminary color conversion with a final color conversion found in the look-up table; and correcting density of the stored image data by accessing a look-up table and substituting a preliminary density with a final density found in the look-up table.

* * * * *

UNITED STATES PATENT AND TRADEMARK OFFICE
CERTIFICATE OF CORRECTION

PATENT NO. : 6,031,641
DATED : February 29, 2000
INVENTOR(S) : Takashi HOSHINO

It is certified that error appears in the above-identified patent and that said Letters Patent is hereby corrected as shown below:

Please correct the Title of the Invention from

"IMAGE PROCESSING APPARATUS FOR DISPLAYING AND ALTERING COLOR IMAGES"

to

--IMAGE PROCESSING APPARATUS FOR DISPLAYING, ALTERING, AND REPRODUCING COLOR IMAGES--

Signed and Sealed this

Eighth Day of May, 2001

*Attest:*

NICHOLAS P. GODICI

*Attesting Officer*   Acting Director of the United States Patent and Trademark Office